Patented Dec. 31, 1946

2,413,432

UNITED STATES PATENT OFFICE 2,413,432

RUBBER DERIVATIVE PRODUCTS

Clarence M. Carson, Cuyahoga Falls, Ohio, assignor to Wingfoot Corporation, Akron, Ohio, a corporation of Delaware No Drawing. Application July 28, 1943, Serial No. 496,434

2 Claims. (Cl. 260—734)

This invention relates to improvements in those rubber derivatives which are known generally as cyclized rubbers and their uses. It includes compositions containing the cyclized rubbers and methods of making and using them, and the resulting products. This application is in part a continuation of my application Serial Number 311,945, filed December 30, 1939, and my application Serial Number 488,087, filed May 22, 1943.

The invention includes coatings which contain partially oxidized cyclized rubbers which give better adhesion, etc., than coatings containing the unoxidized cyclized rubbers. The addition of oxidation inhibitors gives several advantages with respect to moisture proofness, heat sealability, etc. The invention includes such compositions of matter, coatings made therewith, coated products, etc. The invention includes the use of overmilled cyclized rubbers. It includes coatings which contain paraffin wax and other compounding ingredients including rubber hydrochloride, soap, rubber, gum dammar, ester gum, cyclohexanone resin, cumar resins, polymerized isobutylene, etc., and adhesives which comprise methyl abietate, etc. The invention likewise includes products made from paper, glassine, rubber hydrochloride sheet, metallic foils, etc., to which the compositions of this invention have been applied.

Cyclized rubbers may be prepared by treating rubber with various condensing or cyclizing agents. For example, the halide of an amphoteric metal, or chlorostannic acid, or a combination of two or more reagents may be caused to react with rubber under controlled conditions. Boron fluoride may be used as the condensing agent. The derivatives may be formed in the manner disclosed by Sebrell in United States Patent No. 2,052,423 and by Endres in United States Patent No. 2,052,391. This consists essentially in reacting a solution of rubber in benzol with a condensing (or cyclizing) agent, for example, chlorostannic acid or tin tetrachloride and then decomposing the metallic addition product thus formed, and removing the metallic impurities.

A product of this type is now marketed as "Pliolite" resin by The Goodyear Tire & Rubber Company. The rubber derivative may be used in the dry powdered form in which it is recovered by distillation of the solvent from the emulsion produced as described in the Endres and Sebrell patents by adding to water the reacted solution of rubber and condensing agent. The dried product obtained by the above process may vary in physical properties depending on the temperature at which emulsification takes place, the chemical structure of the condensing agents and the pH value of the water. The product usually obtained by the use of tin tetrachloride-hydrochloric acid is a whitish powder, of varying degrees of particle size, but containing a small percentage of material insoluble in coal tar solvents such as toluol or in petroleum solvents, such as "rubber solvent" gasoline. Such solutions are grayish in color and cloudy in appearance, due to suspended insoluble material.

By the process of milling, i. e. by passing this powder repeatedly or continuously through steel rollers, the powder is massed into a sheet, which may be ground, when cooled, into particles the size of a small bean, dark brown to yellow in color. This product is easily soluble in cold toluol or gasoline, giving a much clearer solution than the unmilled. Whereas the unmilled powder in toluol forms a solution too viscous to be applied to a sheet material such as paper, by a dipping or roller application, the milled material is of much lower viscosity and readily lends itself to such applications.

It is possible to extend the useful applications of tin tetrachloride-hydrochloric acid resin by varying the time of reaction or the amount of the reagents. By this means a range of products, having a distortion point of from 5° to 105° C., have been prepared and marketed for various uses.

By the use of other amphoteric halides such as boron fluoride, or phosphorous oxychloride similar products are obtained. The boron fluoride product has the advantage of being more easily freed of metallic impurities and is more easily soluble in toluol and gasoline, with a lower viscosity than the tin tetrachloride product. Hence, it may be used in the unmilled state. The phosphorous oxychloride condensation product is intermediate in solution viscosity, clarity and color, between the boron fluoride and the tin tetrachloride product.

Reference has been made to "distortion point." This is determined as follows: The dried reaction product in its unmilled, or powdered state is molded by heat and pressure into a sheet 10 inches square and ⅛ inch thick. From this sheet, one-inch wide strips are cut. These are placed on two fulcrums, one inch high and 8 inches apart which are immersed in a water bath. The temperature of the water bath is raised 1° C. per minute. At each minute the strip of molded sheet is pushed down at the mid-point between the fulcrums until it touches the bottom of the bath. The pressure is immediately released. When the strip softens to the point where it does not return to its original straight position, the temperature is noted and this is called the distortion point.

For purposes of brevity, Pliolite in its unmilled or powdered form will be called in this disclosure, "Pliolite resin powder" and in the milled condition, "Pliolite resin." The oxidized products referred to herein apparently contain about 3% of oxygen. Pliolite resin is further designated by various numbers, as follows:

| Number | Description | Distortion point |
|---|---|---|
|  |  | ° C. |
| P1233 | Oxidized product | 5-35 |
| P744 | Unoxidized product | 45 |
| Resin #2 | do | 50-60 |
| 29,900 | do | 50-60 |
| P1230 | Oxidized product | 50-60 |
| Resin #40 | Unoxidized product | 75 |
| Resin #20 | do | 95-100 |

In the above list, there are three stages of manufacture grouped at 50-60° C. distortion point. Resin #2 is the unmilled, unoxidized powder; #29,900 is the milled product obtained from resin #2; P 1230 is the oxidized and remilled form of #29,900.

In the above table some of the products are described as oxidized and others are described as unoxidized. Although the latter may contain some oxygen, the term "unoxidized" is used to apply to a cyclized product such as that obtained by reacting a rubber cement with chlorostannic acid under conditions which tend to exclude oxygen from the reacting ingredients. As the rubber cement for carrying out such a reaction on a commercial scale is prepared from milled rubber there is no doubt some oxygen in the product. When the reaction is thus carried out in the absence of oxygen the product obtained by steam distilling the emulsion obtained by pouring the reacted cement into water is a white granular product. This product is substantially entirely soluble in mineral spirits. When this granular product is milled on a rubber mill and the resulting sheet is ground and the ground particles are dissolved or dispersed in mineral spirits a relatively clear solution or dispersion is obtained. Such a soluble product is referred to in the above table as unoxidized.

The oxidized products may be produced in any one of several ways. For example, the reacted cement may be oxidized by passing oxygen through it. Chemicals such as hydrogen peroxide, ammonium persulphate, etc. may be used to accelerate the oxidation. According to a preferred method the dried and milled rubber derivative either in sheet form or as particles, preferably varying in size from that retained by a 10-mesh-per-inch screen and that which completely passes a 2-mesh-per-inch screen may be heated in air or in oxygen gas under carefully controlled conditions.

For example, in the preparation of Pliolite P-1233 the substantially unoxidized product with a distortion point of from about 5 to 35° C. is first milled. The resulting milled sheet is ground to a particle size of the order above indicated. The ground product is placed in trays one inch deep and heated for 18 to 48 hours by circulating air at 175° F. over it. The length of time required for oxidation depends upon the softening point of the P-1233 resin. The product is considered oxidized when it has increased in weight about 3%.

The granular oxidized product resulting from oxidation in a tray as above described is not entirely soluble in mineral spirits. It is more nearly soluble in benzene and toluol, etc. Milling disperses the oxidized portion throughout the whole mass of resin, thereby improving its dispersion in solvents.

The time required for oxidation of the solid material may vary from 12 to 96 hours or longer and the temperature of the air used for oxidation may vary from, for example, about 125° F. to 175° F. In actual practice the softest rubber derivative has been found to oxidize more quickly and at a lower temperature than the harder derivatives. For instance, Pliolite with a distortion point of 15° C. can be oxidized in 12 hours at 150° F. whereas the derivative having a distortion point of 55° C. may require 36 hours at 175° F.

The oxidized product may be dispersed in various solvents such as toluol, gasoline, hydrogenated gasoline, benzol, carbon tetrachloride and various mixtures of the above or similar solvents. The solution viscosity is relatively high. By milling the product and thereby dispersing the outer oxidized shell of each particle, a more easily soluble, low viscosity product is obtained. Various advantages of the oxidized product will be evident from the following disclosure. For instance, the oxidation of a cyclized rubber of low distortion point improves its adherence to Cellophane, cellulose acetate, metals, lithographed papers, etc.

The formula included herein comprise, in addition to the products listed above, melts of the various cyclized rubber derivatives in paraffin or other waxes.

For this purpose, the resin should be in the unoxidized and preferably in the unmilled or powdered form. Use of the milled resin forms a darker colored wax mixture and oxidation decreases the solubility and miscibility with paraffin. While the tin tetrachloride-hydrochloric acid derivative is soluble in paraffin only to a very limited extent, it is easily dispersed and forms a stable mechanical mixture. The boron fluoride mixture is much more soluble, while products obtained by long reaction with a large amount of reagent (resulting in distortion points of 100-150° C.) are soluble in an equal weight of paraffin. They form brittle, wax-like products.

The mechanical mixtures of Pliolite and paraffin are marketed in proportions varying from 5% to 50% Pliolite and are called "Pliowax." Higher concentrations can be prepared if necessary. Pliolite resin powder may be mixed wtih all mineral waxes such as ceresin, Ozokerite, etc., but is not compatible with such vegetable waxes as carnauba and candelilla. However, if the powder is first melted with paraffin, a proportion of vegetable wax may then be added.

Pliowaxes are prepared as follows: 25 lbs. of paraffin are melted at 20 lbs. steam pressure in a steam-jacketed mixer having two Z-type blades rotating toward each other in a horizontal plane. Such mixers are used in the rubber, asphalt, paint and bakery industries and are marketed by the J. H. Day Company and the Baker Perkins Company. 25 lbs. of Pliolite resin powder #2 which preferably has been sifted through a 40-mesh screen, is added to the molten wax. Mixing is continued until a smooth product is obtained. If the melt is to be further diluted with paraffin, it is added at this point.

Endres U. S. Patent No. 2,052,391 describes Pliolite formulae used in paints and lacquers. The present invention relates in particular to Pliolite compositions suitable for use as moisture-vapor proofing coatings for paper, metal foil, regenerated cellulose sheet, cellulose acetate sheet, casein sheet, printed or lithographed labels, and to increase the moisture vapor resistance of such materials as rubber hydrochloride sheet and nitrocellulose coated foil, paper or other sheet material. It further relates to the formulation and use of adhesives containing Pliolite.

Pliolite, like most other materials, requires certain modifying agents depending upon the qualities desired in the final product. Most of the materials in the following list are compatible with Pliolite up to 10% by weight. Modifying agents such as paraffin or ester gum are compatible in amounts as high as 20–25%. With materials such as carnauba wax or ethyl cellulose, less than 10% is the maximum compatibility.

Mention has been made of the process of oxidizing the Pliolite resin and then remilling the oxidized product in order to disperse the oxidized portion, thus obtaining lower solution viscosity, clearer solution and better adhesion. This oxidized product coated on paper may lose its ability to heat-seal at low temperatures or may take on other undesirable characteristics. However, the introduction of oxidation inhibitors will prevent further change in the product. The best oxidation inhibitors are not those commonly used in rubber industry but rather those which have been found to be the best for prevention of gum formation in gasoline. However, the secondary aromatic amines and the water insoluble derivatives of hydroquinone also have been found to prevent rapid aging of Pliolite resins. Some representative inhibitors are listed below under the heading (f). This list is by no means complete, but serves only as a means of designating certain groups.

The plasticizers or modifiers which have been employed in adhesive and moistureproofing compositions include:

(a) Oils: Linseed, palm, soy bean, Perilla, tung, castor, castor derivatives, mineral, oleic acid, Neville oil, bodied tung oil, heat treated tung oil, vegetable oil acids, and animal oil acids.
(b) Waxes: Paraffin, ceresin, candelilla, beeswax, carnauba, Japan, spermaceti, Halowax 1014, octyl alcohol, cetyl alcohol, Opal wax, solid wax alcohols, hydrogenated fatty acids, toluol soluble soaps, (glyceryl mono-stearate), plastic or amorphous waxes.
(c) Gums and resins: Ester, cumar, dammar, copal, purified dammar residue.
(d) Synthetics: Vinylite, Neville resin, Aroclor, AW II, RH-35, Petrex 59-71, Petrex-all, Beckacite, Beckasol, Berex, sucrose octa-acetate, Vistanex-all, Amberol ST-137, ethyl cellulose, benzyl cellulose, triphenyl phosphate, Santicizers, vinyl acetal, glyptals, chlorinated rubber.
(e) Liquid plasticizers: Tricresyl phosphate, dibutyl phthalate, amyl stearate, Hercolyn, Abalyn, glyceryl butyl phthalate, glyceryl abietate, diamyl naphthalene, mono-amyl naphthalene, ethyl lactate, butyl stearate, ethylene glycol, tributyl citrate, dibutyl sebacate, Cardolite, lauryl alcohol.
(f) Oxidation inhibitors:

| Aromatic and heterocyclic bases | Secondary aromatic amines | Phenols and naphthols and ethers, etc. |
| --- | --- | --- |
| o-Amino diphenyl<br>p-Amino diphenyl<br>Diamino diphenyl methane<br>p-Phenylene diamine | Diphenyl-p-phenylenediamine<br>Phenyl-o-tolyl-phenylenediamine<br>p-Hydroxy diphenyl amine | Butyl hydroquinone<br>Pyrocatechol<br>Alpha-naphthol<br>Hydroquinone-monobenzyl ether |
|  | *Aminophenols* |  |
| p-Amino dimethyl aniline<br>o-Toluidine<br>Benzamide<br>n-n′ Di (o-methyl cyclohexyl)-piperazine | o-Aminophenol<br>p-Aminophenol<br>p-Benzylaminophenol<br>2-amino-5-hydroxytoluene | ("Agerite Alba")<br>Veratrole<br>Diamyl hydroquinone<br>"Formaldehyde-phenol-amine condensation products" |

Plasticizers having oxidation inhibiting value:
Glyceryl mono stearate
2-7-hydroxynaphthalene
Amino stearin In order that the utility products containing Pliolite may be understood, the following representative formulae are given:

*Example 1.—Clear paper coating*

| | Parts |
| --- | --- |
| Pliolite P 1230 | 25 |
| Paraffin wax (120° F.) | 5 |
| Toluol | 70 |

This is a representative solution for coating glassine paper. It is applied on a conventional type of paper coating machine either by dipping, whereby both sides are coated, or by roller coating operation on one side. It requires forced drying at 150° F. or higher for 45 seconds. It is desirable to re-humidify the paper at the end of the drying operation by passing it through a moist atmosphere. This coating has very low moisture vapor transfer, high gloss and transparency, heat seals at 300–400° F. on packaging machinery and does not "block" at 120° F., by which is meant the tendency of coated paper to adhere to itself in roll form in warm rooms, thus forming a solid block. This coating has high gloss and transparency on Cellophane, cellulose acetate and other transparent sheeting. On kraft paper it gives a high gloss and a scuff-resistant finish. On printed labels it deepens and brightens colors and gives a degree of gloss known as a "satin finish." The particular advantages of Pliolite coatings are their simplicity of formulation and application. Note that in the above formula there are but two solid ingredients and one solvent. Other coating solutions require a carefully balanced group of materials and two or more solvents. Coating must be done at an elevated temperature and this temperature must be controlled within 5° F. or less. If the solvents are recovered, the process is expensive. In the case of Pliolite coatings, the operation may be carried out at room temperature or higher and there is only one solvent to recover.

Mention has been made of the quality of moisture-vapor transfer resistance. This is desirable in packaging foods; in some cases to prevent diffusion of moisture from the package as in pastry; in other cases to prevent diffusion of moisture into the package as in salt. Experimentally, the moisture vapor transfer rate is measured by sealing a sheet of coated paper over a glass crystallizing dish 2½" in diameter and 2" deep containing 20 cubic centimeters of water. This assembly is weighed, then placed in an oven at 40° C. and zero humidity, for 24 hours. The assembly is then reweighed, the difference being the loss in moisture vapor between 100% and zero humidity and is expressed in grams per square meter per 24 hours.

Coatings of the above type when coated on different kinds of paper show the following moisture vapor transfer rate (M. V. T. R.) at the indicated weights. Weights are in lbs. per 3,000 sq. ft.

| Type of paper | Weight of paper | Weight of coating | M. V. T. R. |
| --- | --- | --- | --- |
| | Pounds | Pounds | Grams |
| Glassine | 20 | 2.5 | 1-10 |
| Sulfite | 20 | 3.5 | 30-40 |
| Printed labels: | | | |
| Solid color | 50 | 3.5 | 30-40 |
| Little color | 50 | 4.0 | 40-50 |
| Kraft (super calendered or other smooth finish) | 40 | 3.5 | 10-20 |
| Parchment | 20 | 3.0 | 20-40 |

The above described method of determining moisture vapor transfer is only one of several. Another method is to place a desiccant (calcium chloride) in a cup in actual contact with the coated paper and place in a humidity cabinet at 65% relative humidity. Other methods are referred to in an article by Abrams and Braebender, Paper Trade Journal, April 9, 1936.

By these methods, Pliolite paper coating is shown to be a superior product for food packaging.

*Example 1a*

| | Parts |
| --- | --- |
| Pliolite P 1230 | 20 |
| Cumar resin | 1 |
| Paraffin 134-37° F. S P | 2 |
| Toluol | 77 |

This is a commercial product well adapted to glassine, parchment, sulfite, kraft, labels and other papers. It has a somewhat higher gloss than Example 1 and this property may be extended by adding more cumar resin.

Cumar resins may be any one of many manufactured by the Neville Company of Pittsburgh, Pa. (given as a source of commercial products of the cumar type).

*Example 1b*

| | Parts |
| --- | --- |
| Pliolite P 1230 | 20 |
| Ester gum | 2 |
| Paraffin (134-37° F.) | 2 |
| p-Benzylaminophenol | 0.4 |
| Toluol | 75.6 |

This is another example of a high gloss, moisture vapor-resistant paper coating. Ester gums from a number of sources have been found to be compatible with Pliolite up to 50% by weight.

*Example 2.—Coating for metal foil[1]*

| | Parts |
| --- | --- |
| Pliolite P 1233 | 15 |
| Paraffin wax (134-37° F.) | 2.65 |
| p-Benzylaminophenol | 0.30 |
| Toluol | 82.05 |

[1] May also be used on glassine, sulfite and other papers, also on Cellophane, cellulose acetate and other sheet materials.

Paraffin wax with a softening point of 148-150° F. may be used.

This coating has a much lower heat-sealing temperature than Example 1, sealing at 170° F. and up. It has better adhesion to metal foil than Pliolite having higher distortion points. It has a slightly lower "blocking" temperature than Example 1, this temperature being about 115° F. This formula is particularly suited for other surfaces such as cellulose acetate, lithographed paper or Cellophane where adhesion of coating to sub-surface is difficult. It is an excellent adhesive for rubber hydrochloride sheet to foil, paper and other sheet materials. The moisture vapor transfer rate is equal to that of Example 1.

*Example 3.—Coating for Cellophane, cellulose acetate or casein sheet materials*

| | Parts |
| --- | --- |
| P 1233 | 15 |
| Paraffin (134-37° F. S P) | 1.5 |
| Gum dammar | 1.5 |
| Toluol | 82.0 |

This formula is somewhat higher in gloss and transparency than Example 2, its other properties being similar.

*Example 4.—Coating for rubber hydrochloride sheet*

| | Parts |
| --- | --- |
| Boron fluoride cyclized rubber | 18.7 |
| Paraffin 134-37° F. S P | 3.5 |
| Rubber solvent gasoline | 78.0 |

The boron fluoride cyclized rubber may be of any distortion point, but preferably in the range from 95° C. to 167° C. It may or may not be oxidized, since it has been found that a substantially unoxidized cyclized resin adheres satisfactorily to rubber hydrochloride sheet. The above example of coating has been found to have somewhat higher transparency than the tin chloride-hydrochloric acid cyclized rubber on rubber hydrochloride sheet. Furthermore, it clarifies the slight haziness common to such a sheet. It also lowers the moisture vapor transfer rate from 20-30 grams per square meter per 24 hours to less than 10 grams, when a coating of 2.5 lbs. per 3,000 sq. ft. is applied. Pliolite coating on rubber hydrochloride has the advantage of a practical heat seal. The seal of a rubber hydrochloride sheet amounts to a weld, which can be broken only by the use of some sharp instrument. The seal of Pliolite on rubber hydrochloride is better than that of the moisture-proof coating presently used commercially on regenerated cellulose (Cellophane) but is not a weld, and can be broken easily. This is of value, for instance, in cigarette packages where the rubber hydrochloride covering, after opening, can be closed again, thus maintaining the freshness of the tobacco.

*Example 4a.—Coating for rubber hydrochloride sheet*

| | Parts |
| --- | --- |
| Milled #40 Pliolite resin | 18.7 |
| Paraffin wax 134-37° F. S P | 3.3 |
| Rubber solvent gasoline | 78.0 |

Referring to the list of distortion points of Pliolite resins, it will be seen that for #40 Pliolite, the distortion point is 75° C. In coating rubber hydrochloride sheet, it is necessary to use a harder grade of Pliolite than in coating paper, to prevent "blocking" (see definition, previously stated), due to the fact that it is much more difficult to remove all solvent from rubber hydrochloride sheet than from coated paper. #40 Pliolite gives equally as good moisture vapor resistance, clarity and heat seal as the example previously cited.

Milled Pliolite #20 may be used instead of the preferred material mentioned above.

*Example 5.—White Pliolite paper coating*

| | Parts |
|---|---|
| Pliolite 29,900 | 100 |
| Titanium dioxide | 65 |
| Paraffin (120° F. S P) | 10.5 |
| Oleic acid | 10 |
| Diamyl naphthylene | 20 |
| Rubber solvent gasoline | 400 |

In this formula the pigment, titanium dioxide, is used in the form of a Pliolite base containing 35% Pliolite 29,900 and 65% titanium dioxide. The pigment and Pliolite are milled together until a homogeneous mixture is obtained which is used in compounding the formula. This coating is applied by a conventional coating machine to white paper, glassine, sulfite or other surface where a flexible, dead white, moisture-proof coating is desired. It requires forced drying at 150° F. for one minute.

*Example 6.—Colored Pliolite coatings for rubber hydrochloride sheet, cellulose acetate sheet, etc.*

| | Ex. 6 | 6a | 6b | 6c |
|---|---|---|---|---|
| Pliolite 29,900 | 57.75 | 22.0 | 30.0 | 74.0 |
| Gum dammar | 19.25 | 7.5 | 10.0 | |
| Carbon black | 23.00 | | | 22.0 |
| Zinc sulfide | | 70.0 | | |
| Iron oxide | | | 60.0 | |
| Raw tung oil | | | | 4.0 |
| Mineral spirits | 300 | 300 | 300 | 400 |

These formulas may be sprayed or brushed on rubber hydrochloride sheet and serve the purpose of mottling or striping different colors over colored or metallic sheet. It is obvious that they offer some protective action to the effect of light and air on the sheet. Adhesion is very good even after long exposure to light. Initial adhesion is improved by pre-oxidation of the Pliolite as previously described. The pigments are incorporated in the Pliolite by the milling process as described by Endres, loc. cit.

*Example 7.—Pliowax solution coatings*

Solutions of Pliolite-wax fusions such as Pliowaxes in toluol or other solvents are used on types of coating equipment not adapted for hot wax coating.

If 500 gms. of unmilled Pliolite resin powder #2 is dissolved in toluol and mixed with 500 gms. of paraffin also dissolved in toluol and the resultant solution allowed to stand for 24 hours, a separation into two layers occurs.

If the 500 gms. of Pliolite resin powder #2 and paraffin are fused together in an internal type mixer, of the type manufactured by the J. H. Day Company or the Baker-Perkins Company and the resultant fusion dissolved in toluol, no separation occurs.

These solutions, varying in concentration from 6% to 35% solid material are useful for coating various types of paper such as kraft, sulfite, bleached sulfite, parchment, glassine or unbleached glassine. A workable formula is as follows:

| | Grams |
|---|---|
| Paraffin wax 148-150° F. softening point | 500 |
| Pliolite resin powder #2 | 500 |

The two materials are mixed by blending in a steam jacketed mixer of the type having horizontally rotating blades of the Z-form. The temperature varies with the distortion point of the Pliolite and the softening point of the paraffin, but 10 to 20 lbs. of steam is usually sufficient. The mix should not be too liquid or the mixing time will be unduly prolonged. When a uniform dispersion is obtained, in which no lumps or particles of Pliolite resin appear, the mix is poured into a shallow tray and allowed to cool.

This material when cut into small pieces is readily soluble in warm toluol. It may be diluted with more paraffin or other waxes and resins and solutions made from these mixtures.

When coated on glassine paper at a weight of 2 lbs. dry weight per 3,000 sq. ft., a somewhat cloudy coating is obtained, due to the high amount of wax. This coating may be clarified by chilling the paper by methods well known in the paper coating trade. The moisture vapor transfer is 2 grams per square meter per 24 hours with zero humidity on one side of the paper and 100% on the other, at 40° C. The method of determining this moisture vapor transfer is described briefly in "Industrial and Engineering Chemistry" vol. 21, No. 5, p. 407, May 1929 and in greater detail by Abrams and Braebender in "Paper Trade Journal" April 9, 1936.

When coated on kraft paper, a much heavier coating (about 15 lbs. per 3,000 sq. ft.) is necessary to obtain the same degree of moisture-vapor transfer resistance as with coated glassine.

With sulfite papers a weight of 6–8 lbs. per 3,000 sq. ft. results in a moisture vapor transfer rate of 10 to 20 grams per square meter per 24 hours.

Parchment papers require about the same weight of coating as sulfite papers for the same moisture vapor resistance.

All of the above papers, coated from this type of solution have a heat seal at 170–400° F., strong enough to tear the paper when the seal is broken. The coated papers do not stick together when stored in roll form at temperatures up to 110° F.

The lack of high transparency in this coating is not a particular defect on kraft and other opaque papers, in view of the other qualities imparted to the papers.

In the formula of Example 8, the Pliolite-paraffin wax fusion of Example 7 is used.

*Example 8*

| | Grams |
|---|---|
| Pliolite-paraffin wax fusion | 100 |
| Cetyl alcohol | 10 |
| Toluol | 1200 |

When coated on glassine, this formula resulted in a more transparent sheet than the formula described in Example 7 and was quite brilliant after chilling. The moisture vapor transfer was 8 grams per square meter per 24 hours, on a 5 lb. per 3,000 sq. ft. of coating.

This coating will slip over, without sticking to a hot iron. In the bread wrapping industry, loaves of bread are wrapped in paraffined paper by sealing the bottom and ends by means of electric irons, shoes, or tables heated as hot at 400° F. Many coating materials stick to the irons at high temperature, thus preventing a proper seal. It has been found that the Pliolite coating of Example 8 will operate on a bread packaging machine as well as paraffined paper.

It has the advantage over a paraffin coating of being more flexible, giving a better heat seal, and being less subject to crystallization at low temperature, the sum of all these qualities being lower moisture-vapor transfer when used in packaging foods.

Pliolite P 1233 coating as described under Example 3, Pliowax solution as described under Examples 7 and 8 or Pliowax applied as described in Example 9 is a satisfactory laminating adhesive for a variety of sheeting materials.

*Example 9*

Pliolite P 1233 plus 10% paraffin, dissolved in toluol or a mixture of toluol and gasoline is spread on glassine paper, cellulose acetate sheet, metal foil, nitrocellulose-coated paper or foil or on other similar papers. When nearly dry another material, for instance, Pliofilm (rubber hydrochloride sheet manufactured by The Goodyear Tire & Rubber Company) is pressed down upon the coating and passed under a warm metal roller. In this manner laminations of Pliofilm to glassine, to kraft paper, to Cellophane, to foil, etc. may be made. Paper may be laminated to foil; the combinations are numerous.

Pliowax in solution or as a hot wax may be coated on more porous paper such as kraft or parchment and laminated to itself by the use of heat and slight pressure.

*Example 10*

Modifications of the Pliowaxes may be made by adding to them various resinous or gummy materials whereby laminations of kraft or parchment to Cellophane, foil, or cellulose acetate sheeting may be made.

An example of the latter is:

| | Parts |
|---|---|
| Pliolite resin powder #2 | 40 |
| Paraffin wax 135° F | 40 |
| Vistanex (polymerized isobutylene) | 20 |

Another example is:

| | Parts |
|---|---|
| Pliolite resin powder #2 | 40 |
| Paraffin wax 135° F | 40 |
| Cumar resin | 20 |

This wax melt is prepared by the method described under Example 7 and is coated on glassine or other type of paper by the so-called hot wax process which consists of running the paper through the melted wax, maintained at a temperature of 180–200° F. then passing over a chilled drum and winding up in a roll form.

*Example 11*

| | |
|---|---|
| Pliolite resin powder (distortion point 75° C.) | 7.8 |
| Paraffin wax (S P 148–50° F.) | 78.2 |
| Dammar residue | 6.2 |
| Hydrogenated castor oil | 7.8 |
| | 100.0 |

Paper coated with all wax or with mixtures of wax and Pliolite in which the Pliolite is less than about 10% of the total weight of coating will tend to adhere in a solid mass if stored at temperatures above 120° F. The introduction of dammar residue prevents this adhesion or "blocking." Dammar residue is a product obtained from crude gum dammar, a product well known in the varnish and lacquer industry. The crude gum is dissolved in hot toluol, and filtered to remove dirt. Acetone or alcohol is then added in sufficient quantity to precipitate the so-called "dammar residue." This product may be further purified by redissolving in toluol and reprecipitation by alcohol or acetone.

Paper coated with the wax mixture described in Example 11 has a much superior heat seal than that obtained from paraffin wax and the Pliolite alone.

The moisture vapor transfer rate is 9.3 grams/sq. meter/24 hours through a 7 lb. per ream coating, 40 grams through a 6 lb. coating.

*Example 12.—Method of incorporating metallic soaps with Pliolite*

Metallic soaps such as zinc stearate, calcium stearate, zinc palmitate, aluminum palmitate, and others convey certain qualities to paper coatings. For instance, when used in a Pliolite paper coating on a printed or lithographed label for cans, the coating becomes scuff resistant (as in packing a number of cans in a box for shipment); if the cans are packaged containing a hot material, (as is done with salt) they must have a coating which will not soften with heat and cause the labels to adhere to each other. Metallic salts in a Pliolite coating on glassine can be used to make the paper "block resistant" (see Example 1) at temperatures much higher than 120° F., for instance, when stored in hot warehouses or freight cars in tropical climates. However, these soaps must be dispersed in Pliolite in the dry state in order that, when coated on paper, the coated surface shall have gloss, transparency and smoothness. In the normal milling process, due to the extreme lightness of the soaps, there is considerable loss due to this characteristic. It is also a slow and therefore expensive process and metallic soaps, when inhaled, are definitely hazardous to the health. Example 12 discloses a process for incorporating Pliolite in an unoxidized form and metallic soaps, by a cheaper, less hazardous process. Zinc palmitate, for instance, is placed in a steam-jacketed Day or Baker-Perkins type mixer (see Example 7) and melted, using in this case, 60–70 lbs. of steam (153–158° C.). Pliolite resin powder #2 weighing one-half of the zinc palmitate is then added slowly and the mixing operation continued until a smooth, uniform melt is obtained. The product, when cooled is hard and brittle, grayish brown in color, with a soapy feel. It can then be readily milled into more Pliolite resin powder in any proportion required by the coating solution formula.

The Pliolite-soap melt is as follows:

| | Grams |
|---|---|
| Zinc palmitate | 500 |
| Pliolite resin powder #2 | 250 |

This can be milled into Pliolite powder in the proportion of:

| | Parts |
|---|---|
| Pliolite resin powder #2 | 92 |
| Pliolite-soap melt | 8 |

Or the Pliolite-soap melt can be dissolved into the following solution:

| | Parts |
|---|---|
| Pliolite resin 29,900 | 35 |
| Pliolite-soap melt | 15 |
| Cumar resin | 3 |
| Paraffin wax (120° F.) | 2.65 |
| Toluol | 125 |

This solution when coated on printed labels to be wrapped around pasteboard cartons gives a moisture vapor transfer rate equal to that obtained when the metallic soap is milled into the Pliolite resin. This figure is 30 to 50 grams per square meter per 24 hours measured with zero humidity on one side and 100% humidity on the other.

In the above formulae, Pliolite resin powder #2 is used. However, this is not meant to limit the use of Pliolite to one distortion point in this product. Resin powders made by other cyclizing agents and over a range of distortion points from about 25° C. to 150° C. may be used.

Example 13.—Overmilled Pliolite

In order to produce ordinary milled Pliolite a batch of 40 lbs. is worked on the ordinary 40" rubber mill for 15 minutes. By overmilling the Pliolite, for example, by milling 40 pounds of Pliolite resin powder for 30 minutes, a resin is produced from which solutions of improved clarity and lower viscosity are obtained. For example, by dissolving 55 parts of such overmilled Pliolite with 45 parts of paraffin (S P 120–24° F.) in toluol and applying it to glassine by dipping a clear film is obtained. No quenching is required. By quenching is meant the operation known to those skilled in the art which consists in passing the coated and dried paper over a chilled metal drum or under a cold water spray. This causes the paraffin wax in the coating to become fixed in the coating. Using ordinary Pliolite it is necessary to quench to obtain a clear coating of 45% paraffin content and on standing the excess wax will come to the surface in an opaque or cloudy film, known as a "wax bloom."

Example 14.—Milled mixtures of Pliolite and other resins and modifying agents It has been found that the compatibility of Pliolite with some modifying agents is increased by mixing the ingredients by the process known as "milling" (on a two-roll rubber mill). Probably a reduction in particle size of the ingredients occurs on milling, which does not occur on mixing them in solution.

Also, to render Pliolite resistant to certain vegetable and animal oils and fats, it has been found desirable to mix it with other materials such, for example, as rubber hydrochloride. For example, the following materials may be milled together:

| | Parts |
|---|---|
| Pliolite powder #2 (55° C.) | 75 |
| Rubber hydrochloride (30% chlorine content) | 25 |

After milling, 30 parts of the above are dissolved in 100 parts by weight of chloroform or carbon tetrachloride. Three to 5 parts of paraffin wax and a small amount of liquid plasticizer such as 1 to 2.5 parts of diamyl naphthalene are added. This mixture may then be thinned by adding a solvent such as toluol. A final composition containing 7.5% of solids has been found to give good resistance to animal and vegetable oils when coated on glassine paper. The above composition of this solids content warmed to 125° F. coated on paper was found very satisfactory.

Instead of using rubber hydrochloride, chlorinated rubber may be used where resistance to oils and fats is not so important. A larger amount of paraffin may be added to increase resistance to moisture-vapor transfer.

In milling the two ingredients together the Pliolite powder is first placed on a two-roll rubber mill. After the Pliolite has been consolidated and milled into a smooth mixture, the rubber hydrochloride is added as rapidly as possible and the mixture cut and rolled several times on the mill, by a method known to any one familiar with milling rubber. After removing from the mill the mixture is cooled and broken up.

Although particularly recommended for the coating of glassine or other papers, compositions of this type may be used on other materials such as wood, metal (including foils) stone, etc. A coating of 3# per ream on glassine paper will give good resistance to moisture transmission. The coated paper can be heat sealed at 250–275° F.

Example 15.—Paper coating [1]

| | Parts by weight |
|---|---|
| Pliolite 29,900 | 24 |
| Paraffin wax (S P 120° F.) | 2.7 |
| Cyclohexanone resin | 2.1 |
| Diamyl naphthalene | 1.2 |
| Solvent | 70.0 |

While these ingredients may all be dissolved separately in the solvent, a lower solution viscosity is obtained by first milling them together. Milling also increases the speed of solution. A low boiling gasoline may be used for the solvent. Various coal tar solvents such as toluol, chlorinated solvents such as carbon tetrachloride and hydrogenated naphthas such as "Solvesso" or the aromatics marketed by The Union Oil Company may be used.

This formula gives a coating for glassine paper which is highly resistant to moisture-vapor transfer. It may be used on other papers such as sulfite, bond paper, kraft paper, rotogravure paper, cardboard, etc. Its high gloss and transparency make its use over lithographing on paper book covers, posters, labels, etc. highly desirable. The various colors are strengthened by the use of this type of lacquer. Coating glassine with 1.5 to 2 lbs. per ream gives very high resistance to moisture transmission. Such paper has excellent heat-sealing properties when heated to high temperatures. It has high gloss and transparency and presents no blocking difficulties. To get the best results it is desirable to use a higher melting paraffin such as those with a softening point from 120–160° F.

The cyclohexanone resins, or more generally any cyclic ketone polymers containing six carbon cycles, give excellent results in formulae of this type for coating papers. The resin known as AWII resin sold by the Advance Solvents and Chemical Company of New York city is recommended.

Instead of amyl naphthalene, other alkylated naphthalenes may be used as plasticizers. Hydrogenated alkylated naphthalenes are also satisfactory.

The above formula comprising the cyclohexanone is to be preferred over formulae containing no such resin or the equivalent thereof for moistureproofing operations where blocking is objectionable. Without the use of such a resin or its equivalent, blocking is apt to result where a Pliolite soft enough to heat-seal at 350° F. is employed.

Sheets coated with the above formula can be piled to a depth to withstand a pressure of 3 lbs. per square inch at 120° F. for 24 hours without sticking together, i. e., without blocking.

Example 15a

| | Parts |
|---|---|
| Pliolite resin powder #2 | 95 |
| Cumar resin | 5 |

These materials are blended on a two-roll rubber mill, the resultant product having lower solution viscosity in toluol or gasoline, slightly lower

---

[1] This is a representative coating containing wax, modifying resin and plasticizer.

cost and higher gloss and transparency on paper. It is suitable as a coating for glassine, labels, and other papers if 5-20% paraffin wax is dissolved with it in suitable solvents.

If the mixture is oxidized by hot air according to the described method of oxidizing Pliolite, the resulting product has better adhesion to inks, lithographed labels, metal foils and the various transparent sheeting materials mentioned under Examples 2, 3, and 4.

*Example 16*

| | Parts |
|---|---|
| Pliolite resin powder #2 (55° C. S P) | 90 |
| Paraffin (120° F. S P) | 9 |
| "Vistanex" (polymerized isobutylene) | 9 |
| "Agerite White" (dibeta naphthyl-p-phenylene-diamine) | 1 |
| Gasoline | 300 |

The Pliolite powder is fed through the mill until a band is formed; then the Vistanex is added slowly in small pieces and the milling continued until the batch contains no lumps. Then the Agerite White is added and the milling continued until a uniform product is obtained. The batch is cut from the mill and allowed to cool, after which it is broken into small small pieces and dissolved in gasoline. This solution is uniform throughout after standing for 24 hours whereas a solution prepared by dissolving the various ingredients in gasoline, separates into two layers.

*Example 16a*

| | Parts |
|---|---|
| Pliolite resin powder #2 | 90 |
| Vistanex | 9 |
| Paraffin (120° F. S P) | 9 |
| "Solux" (p-hydroxy-phenyl-morpholine) | 1 |
| Gasoline | 300 |

This is mixed in the same way as Example 16, the purpose of the Agerite White (in Example 16) and Solux in this case being that of an oxidation inhibitor, whose action is to prevent the Pliolite from becoming hard and brittle through oxidation. The formulae of Examples 16 and 16a are suitable for providing a moisture vapor-proof, heat-sealing coating for various kinds of paper such as glassine.

*Example 17.—Coating for labels, glassine, parchment and other types of paper*

| | Parts |
|---|---|
| Pliolite resin powder #2 | 73 |
| Paraffin (120° F. S P) | 9 |
| Diamylnaphthalene | 4 |
| Petrex #59-71 | 14 |
| Gasoline | 300 |

The first four ingredients are mixed by milling as described in Example 16a, then dissolved in gasoline. Whereas a cold cut mixture separates into two layers, the milled mixture is much more stable. In all cases, both preceding and following, the milled mixture forms a much less viscous solution than the mixture made by blending the separate ingredients in cold solvent. This is advantageous in coating operations as the more viscous solutions tend to form a heavier, more uneven coating.

*Example 18*

| | Parts |
|---|---|
| Pliolite resin powder #2 | 75 |
| "Parlon" (chlorinated rubber) | 25 |
| Toluol | 300 |

The milled mixture of Pliolite and Parlon (a chlorinated rubber) is easily soluble in toluol and forms a thin solution adaptable for paper coating. The clarity, heat seal and resistance to moisture vapor transfer are improved by the addition of 5 parts paraffin and 5 parts diamyl naphthalene.

*Example 19*

| | Parts |
|---|---|
| Pliolite resin powder #2 (55° C. S P) | 50 |
| Pliolite P 1233 (4° C. S P) | 50 |

When Pliolite P 1233 with a low distortion point, for example around 5° C., is used alone as a paper coating, it causes the paper to "block." If such a solution is mixed with a solution of 55° C. S P Pliolite, blocking still occurs. However, if the two grades of dry Pliolite are blended on a rubber mill in the above proportions, a uniform product having a distortion point of 29° C. is obtained which does not "block" when coated on paper. It is readily soluble in gasoline or toluol and paraffin, or other modifying agents may be added.

The addition of oxidation inhibitors to the formulae given herein has been found generally beneficial. Oxidation inhibitors prolong the period during which Pliolite coatings offer high resistance to moisture transmission. Pliolite coatings containing oxidation inhibitors are heat-sealable after a longer period of aging than coatings containing no oxidation inhibitor. Adhesives containing oxidation inhibitors remain similarly adherent for longer periods of time. Oxidation inhibitors also prolong the life of a coating in that they retain adherence to paper, cellulose acetate, nitrocellulose, Cellophane, metal foil, cloth, etc. for a prolonged period of time. After the seal is made, it is more permanent than in the absence of an oxidation inhibitor. The anchorage to such bases is more permanent. Formulas for the use of oxidation inhibitors which are representative of their use follow: See also Examples 16 and 16a.

*Example 20.—Coating for cellulose acetate*

| | Parts |
|---|---|
| Pliolite P 1230 | 88.35 |
| Paraffin 120° F. S P | 3.8 |
| Opal wax (hydrogenated castor oil) | 2.5 |
| Diamyl naphthalene | 4.2 |
| "Vanox" | 1.15 |

"Vanox" consists of .5 of pyrogallol, 0.25 part hydroquinone and 0.25 part triethanolamine. This gives a satisfactory coating for cellulose acetate which retains its resistance to moisture-vapor transmission and its heat-sealing properties for a prolonged period.

*Example 21.—Pliolite paper coating*

| | Parts |
|---|---|
| Pliolite P 1230 | 79.0 |
| Paraffin wax (20° F. S P) | 9.0 |
| Cyclohexanone resin | 7.0 |
| Diamyl naphthalene | 4.0 |
| "Vanox" | 1.0 |

By dissolving the Pliolite, paraffin, the cyclohexanone resin (which may be resin AWII) and the other above ingredients in gasoline, a coating for glassine paper, cellulose acetate sheet and the like is obtained. These sheets may be coated by being dipped in the solution.

Since it is necessary to oxidize Pliolite for most coating purposes, it is advisable to control this oxidation by the use of oxidation inhibitors or anti-oxidants. It has been found desirable to add oxidation inhibitors to Pliolite compositions for certain purposes, namely to increase the life of the coating as represented by resistance to moisture-vapor transfer by retention of heat-seal and by resistance to brittleness. For example, it is advantageous to oxidize Pliolite 29,900 when used in the preparation of compositions which are to be applied to glassine paper to be used in packaging foods. For example, tin or cardboard cans, packed for shipment in cartons or boxes, require labels coated with a material which will not scuff or deface due to rubbing together during shipment. For example, Pliolite unoxidized has relatively poor adherence to nitrocellulose coated foil or to nitrocellulose-coated paper. However, if the Pliolite, for example Pliolite P 1233, is oxidized prior to being compounded into a coating or adhesive for adherence to nitrocellulose, the adhesion will be improved.

*Example 22.—Coating for metal foil*

|  | Parts |
|---|---|
| Pliolite P 1233 | 15 |
| Paraffin 148–50° F | 1.5 |
| n-n'-Di-methylcyclohexyl piperazine | 0.6 |
| Rubber solvent gasoline | 82.9 |

*Example 23.—Pliolite silk coating*

|  | Parts |
|---|---|
| Pliolite resin 29,900 (55° C. S P) | 10 |
| Beckosol 31 (oil extended phthalic resin) | 10 |
| Oleic acid | 3.5 |
| Paraffin (120° F. S P) | 1.75 |
| "Agerite Alba" (hydroquinone monobenzyl ether) | 0.25 |
| Carbon tetrachloride | 60 |

This solution is coated by dipping in it, unweighed silk, of the grade used in the manufacture of oiled silk. The coated silk is baked 25 minutes at 100° C., resulting in a flexible silk coating. The presence of "Agerite Alba," an oxidation inhibitor, prevents the coating from becoming brittle.

*Example 24.—Adhesives*

|  | Parts by weight |
|---|---|
| Pliolite resin powder #2 | 10 |
| Methyl abietate ("Abalyn") | 25 |

Adhesives using Pliolite and other cyclized rubbers are, in general, highly water resistant. Even where the rubber derivative equals only as much as 15% of the total solids of the adhesive, good water resistance may be obtained. A general formula for preparing adhesives consists in taking the rubber derivatives such as an unoxidized Pliolite (either in the powdered form or after milling and grinding) and dissolving in an oily or viscous liquid such as abietic acid, an alkyl abietate, e. g. methyl abietate or their hydrogenated products. Solution is effected by heating, as for example, heating from 140 to 200° C. This results in a yellow to black tarry material which is soluble in petroleum or coal tar solvent and may be used as an adhesive for paper, cloth, etc. and for Pliofilm to cardboard, when dissolved in gasoline and spread on the Pliofilm.

*Example 25*

|  | Parts |
|---|---|
| Pliolite powder #2 | 10 |
| Methyl abietate | 25 |
| Bodied tung oil | 10 |

This adhesive may be used for uniting Pliofilm to oiled silk, etc.

*Example 26*

|  | Parts |
|---|---|
| Pliolite resin powder #2 | 10 |
| Methyl abietate (Abalyn) | 25 |
| Titanium oxide | 10 |

When dissolved in an equal weight of gasoline, can be used as a white opaque adhesive for Pliofilm to cardboard.

*Example 27*

|  | Parts |
|---|---|
| Pliolite resin powder #2 | 10 |
| Methyl abietate | 25 |
| Bodied tung oil | 10 |

Dissolved in an equal weight of gasoline and spread on Pliofilm, it is an adhesive for oiled silk to Pliofilm.

*Example 28*

|  | Parts |
|---|---|
| Pliolite resin powder #2 | 10 |
| Methyl abietate | 25 |
| Balata resin | 40 |
| Cumar resin | 30 |
| Rubber (dead milled) | 7 |

The Pliolite resin is dissolved in the methyl abietate by heating. When cool, the mixture and other ingredients are dissolved in an equal weight of gasoline. The composition is suitable as an adhesive for various purposes as for uniting rubber hydrochloride film to oiled silk and glassine paper.

*Example 29.—Adhesive*

|  | Parts |
|---|---|
| Pliolite powder #2 | 10 |
| Methyl abietate | 25 |
| Balata resin | 40 |
| Cumar resin | 30 |
| Rubber | 7 |

The Pliolite powder is dissolved in the methyl abietate by heating to around 200° F. This is cooled and dissolved in toluol. The other ingredients may be added after dissolving in toluol or other solvent. As an alternative method the milled mix of Pliolite and methyl abietate may be added to the other ingredients and solvent in a mechanical mixer such as a cement churn or Day mixer or the like. This adhesive may be used to cement Pliofilm to glassine paper in forming wrapping materials for foods, cosmetics, etc.

Other solvents for Pliolite and the like may be used in the preparation of adhesives for various purposes include diamyl naphthalene (and similar alkyl naphthalenes, e. g. dibutyl naphthalene), chlorinated diphenyls, chlorinated diphenyl oxides, dibutyl phthalate and other phthalates commonly used as plasticizers such as diamyl, dicyclohexyl, and also, tricresyl phosphate and other phosphate plasticizers.

When the rubber derivative is melted with a wax such as chlorinated naphthalene, a thermoplastic adhesive material is formed. This may be used on metals etc.

In preparing the adhesives, it is further desirable to dissolve the Pliolite in the plasticizer before dissolving in a solvent. For example, the Pliolite is best dissolved in the abietates by heating before being brought into solution in the solvent. Adhesives are similarly prepared by dissolving Pliolite in almost any other miscible plasticizer and then dissolving the mixture in a solvent.

Example 30

| | Parts |
|---|---|
| Rubber (pale crepe, milled) | 4.0 |
| Pliolite 29,900 | 7.0 |
| Balata resin | 16.0 |
| Cumar resin | 12.0 |
| Abalyn (methyl abietate) | 10.0 |
| Phenyl-beta-naphthylamine | 0.12 |
| Gasoline | 50.88 |

The Pliolite is dissolved in the methyl abietate. The ingredients are then all dissolved in gasoline.

This adhesive is used in laminating Pliofilm to paper and the purpose of the oxidation inhibitor is to prevent the adhesive from drying out and becoming brittle.

Example 31.—Coating and adhesive

| | Parts |
|---|---|
| Pliolite P 1233 | 82.2 |
| Paraffin | 14.5 |
| Diamino-diphenyl-methane | 3.3 |

Dissolve in 400 parts by weight of toluol or rubber solvent gasoline. The para, para'-diamino-diphenyl-methane may vary from one to six per cent on the Pliolite. It may be used with both the oxidized and unoxidized rubber derivatives.

This composition has proved very satisfactory as a coating for aluminum foil and may be used for laminating rubber hydrochloride film (Pliofilm) to aluminum foil, paper, etc.

Example 32.—Label coating

| | Parts |
|---|---|
| Pliolite 29,900 | 60.8 |
| Cumar resin | 18.4 |
| Paraffin (134° F.) | 9.2 |
| Liquid petrolatum | 9.2 |
| Antioxidant | 2.4 |

Rubber solvent gasoline or other suitable vehicle such as toluene, carbon tetrachloride, mixed aromatics, etc., is employed. The antioxidant is the condensation product of a phenol, formaldehyde and an amine which may, for example, be prepared as follows:

22 g. (0.2 mol) of resorcinol and 52.0 g. (0.6 mol) of morpholine were charged into a suitable apparatus and stirred until nearly all of the resorcinol had gone into solution. Then with constant stirring, 5.10 g. (0.6 mol) of 35% formaldehyde was run in slowly at a temperature below 35° C. After the formaldehyde had all been added, the reaction mixture was heated until all crystalline material had disappeared (temperature 90–95° C.). To this was then added 75 g. of benzene, and the mixture was refluxed. Water was trapped out from the reflux return until the benzene solution was dry. After cooling, the product crystallized partially from the benzene solution. The amount of crystalline material may be reduced or resinified by heating.

The phenol and amine used in the above condensation may be varied and may be used in different proportions as indicated by the following table:

| Phenol | Amine | Formaldehyde | Molecular ratio |
|---|---|---|---|
| Phenol | Morpholine | Formaldehyde | 1:3:3 |
| Do | Cyclohexylamine | do | 1:3:3 |
| Do | Diethylamine | do | 1:3:3 |
| Do | Morpholine | do | 1:2:2 |
| Resorcinol | do | do | 1:3:3 |

Each of the condensation products thus produced is a satisfactory antioxidant with either oxidized or unoxidized Pliolite.

Example 33.—Adhesive

| | Parts |
|---|---|
| Rubber (dead milled) | 4.0 |
| Pliolite P 1233 | 4 |
| Balata resin | 16 |
| Cumar resin | 4 |
| Diamyl naphthylene | 3 |
| Phenyl-b-naphthylamine | 0.5 |
| Ethyl acetate | 31.5 |
| Gasoline (boiling range 60°–90° C.) | 37 |
| | 100 |

This is an example of a pressure sensitive adhesive useful in laminating Plifilm to itself to form a packaging material of double thickness and improved flexibility over a material made by heat sealing two layers of film together without adhesive. It does not increase the moisture resistance of the Pliofilm and in this respect is superior to all other adhesives.

The Pliolite improves the strength of the adhesive from a figure of 250 gms. per inch to over 600 gms. per inch.

The adhesive is also useful in laminating Pliofilm to other clear films and to metal foils, paper, etc.

I claim:

1. A stabilized, partially oxidized cyclized rubber composition which contains diamino diphenyl methane as a stabilizer.

2. A cyclized rubber oxidized to an oxygen content of about 3%, stabilized with diamino diphenyl methane.

CLARENCE M. CARSON.